March 7, 1967     S. B. TURNER     3,307,427
CONSTANT SPEED DRIVES
Filed Aug. 26, 1964     2 Sheets-Sheet 1

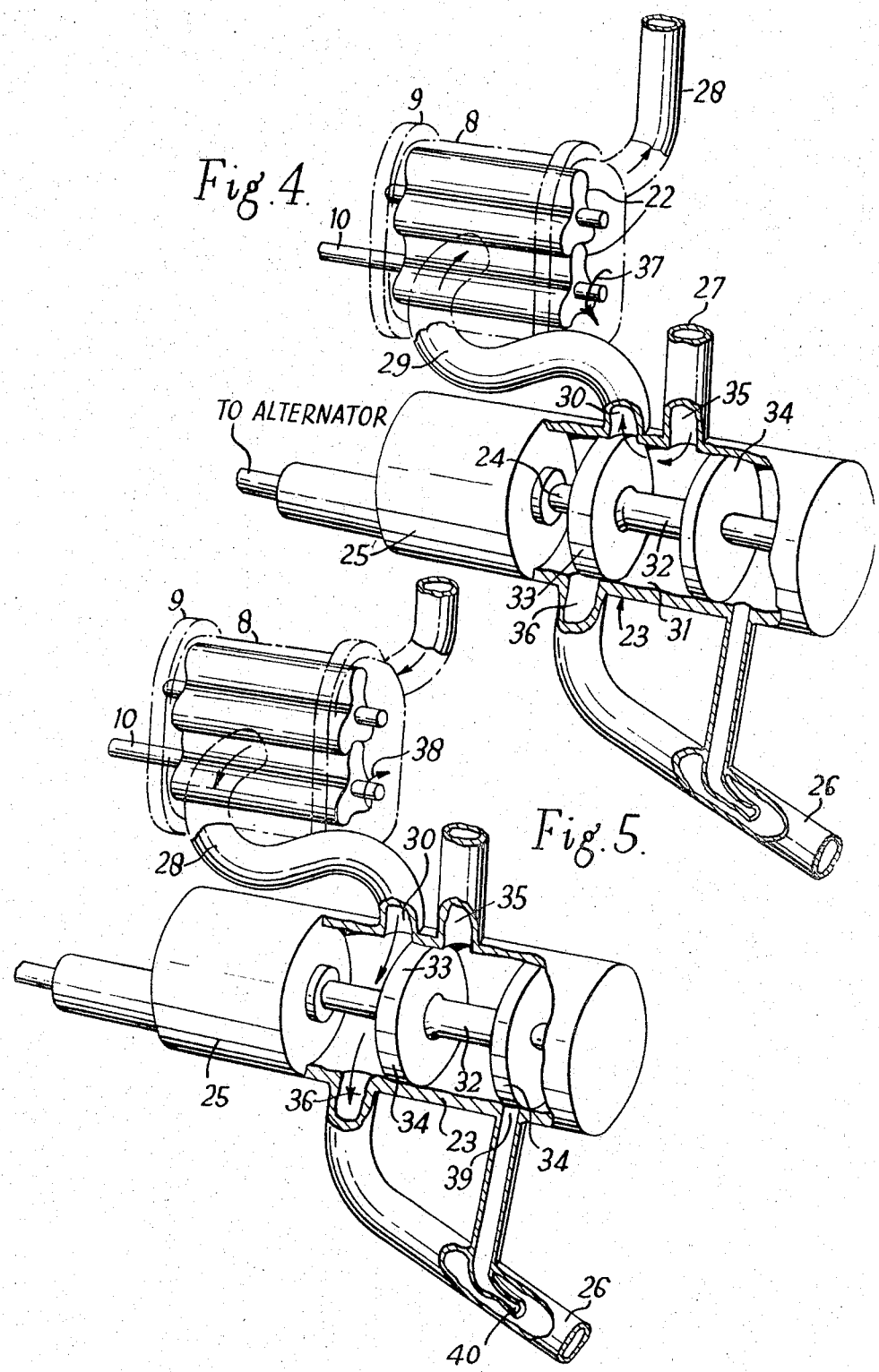

United States Patent Office 3,307,427
Patented Mar. 7, 1967

3,307,427
CONSTANT SPEED DRIVES
Stanley B. Turner, Camberley, England, assignor to Plessey Company Limited, Essex, England, a British company
Filed Aug. 26, 1964, Ser. No. 392,342
Claims priority, application Great Britain, Jan. 16, 1961, 1,773/61
4 Claims. (Cl. 74—675)

The invention of the present application, which is a continuation-in-part of my application Serial No. 163,362, filed December 29, 1961, now abandoned, relates to constant-speed drives in which the speed of an element, hereinafter called constant-speed element, for which under normal circumstances at least the greater part of the driving power is derived from an engine operating at a variable speed, for example from an aircraft-propulsion engine, is kept constant by adding to the engine-derived speed a speed variable between a positive maximum and a negative maximum and derived from an auxiliary motor which is coupled to the main engine or the like and to the constant-speed element through a differential gear drive. The specification of co-pending United States application Serial No. 38,671, assigned to the assignees of the present application, describes an arrangement of this kind in which the auxiliary motor is an air motor of the positive displacement type and can be utilised for starting the engine. This is achieved by driving the auxiliary motor in the "reverse" direction in which its output tends to decrease the engine-derived speed of the constant-speed element, while preventing reverse rotation of the constant-speed element, and means are also provided in the described arrangement which enable the air motor to be used for so-called ground running, that is to say for running the constant-speed element in its normal direction when the engine is stationary and disconnected from the drive.

The present invention has for its object to permit the auxiliary motor to be used for starting the engine without the need of driving the auxiliary motor in a direction opposite to that at which it is driven when it has to supplement the engine-derived speed of the constant-speed element.

According to the present invention an additional gear wheel is mounted on the shaft of the auxiliary motor or on a shaft having a constant speed ratio to the said shaft, and is connected to the constant-speed element through gearing by-passing the differential gear drive, the ratio of said by-pass gearing being such that during constant-speed operation the speed of the additional gear wheel always exceeds the speed of the shaft on which it is mounted, and an over-running clutch being provided between the said additional gear and the air motor shaft. When it is desired to start the engine or effect ground running, the air motor is driven in the same direction in which it is driven to supplement the engine-derived speed of the constant-speed element during normal constant-speed operation. Since at the commencement of the starting operation the engine is stationary, this causes the shaft of the air motor to run faster than the additional gear, thus locking the over-running clutch and adding thereby an additional constraint in the differential gear drive. This causes the differential gear drive to drive both the constant-speed element and the normally engine-driven input shaft at speed proportional to the speed of the air motor, so that if the engine is connected to this input shaft in the normal way, the air motor will start the engine, while if the engine is disconnected from the input shaft, the air motor will positively drive the constant-speed element. The gear ratios are so selected that the resulting engine speed in one case and the resulting speed of the constant-speed element in the other case are respectively suitable for starting and ground running.

The invention is illustrated in the accompanying drawing in which:

FIGURE 1 diagrammatically illustrates part of a combined engine starter and constant-speed drive under normal constant-speed drive conditions with the engine running at a speed at which an additional speed contribution is required from the air motor.

FIGURE 2 similarly shows the same embodiment at high engine speeds, in which the air motor is caused to run as a pump driven by reaction from the differential gear drive to reduce the engine-derived speed of the constant-speed element.

FIGURES 4 and 5 are diagrammatic perspective views showing the air motor and control valve in more detail, FIGURE 4 showing a control valve in the position occupied at low speeds of the engine and FIGURE 5 showing the valve in the position for high speeds of the engine.

Figure 1:
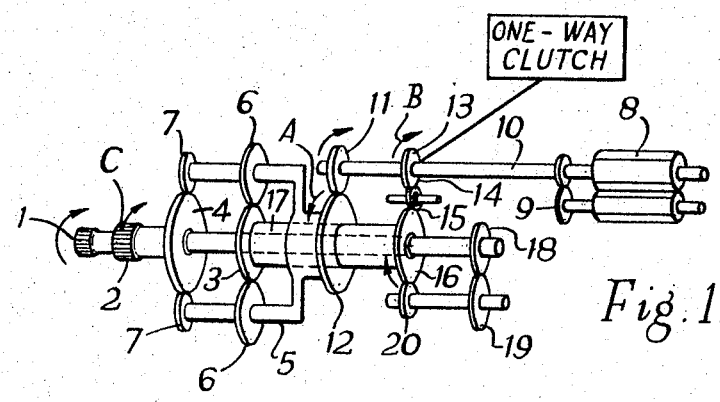

Referring now to the drawing, the constant-speed drive has a constant-speed shaft 1 coupled or adapted to be coupled to an alternator 21 or other element which is required to be driven at a constant speed of 8,000 revolutions per minute, and a hollow engine-connection shaft 2 detachably coupled by means 22a to a gas-turbine engine 22 having a cruising-speed range from 4,300 to 8,700 r.p.m. The engine-connection shaft 2 carries a sun wheel 4, and the constant-speed shaft 1 carries a gear wheel 18 which, through reducing gearing 19, 20, 16 and a hollow shaft 17, encircling the alternator shaft 1 and the engine-connection shaft, is connected to a second sun wheel 3. The two sun wheels 3 and 4 form part of a differential gear drive which also comprises a planet carrier 5 equipped with at least two pairs of rigidly interconnected satellite gears 6, 7 respectively meshing with the sun wheels 3 and 4. An air motor of the positive-displacement type, for example a Roots motor 8 having phasing gears 9, has a shaft 10 which, by gears 11 and 12, is in driving co-operation with the planet carrier 5. The air-motor shaft 10 also carries an additional gear wheel 13 which is connected to the air motor shaft by an over-running sprag clutch 14. This additional gear wheel 13 is in driving co-operation, through an idler 15 with a gear 16 mounted on the shaft 17 of the sun wheel 3. The air motor 8 is controlled by a control-valve device 23 which has an atmospheric connection 26 and a pressure-supply connection 27 and is subject to the action, transmitted by means 24, of a governor 25, responsive to speed variations of the alternator 21 to cause the air motor 8 to be driven by air from the pressure source or supply connection 27 to increase the engine-derived speed of the constant-speed shaft when the speed of the turbine engine is below a pre-determined value, and to establish a circuit causing the air motor to be driven in the opposite direction to reduce the engine-derived speed of said shaft when the speed of the turbine engine is above said pre-determined value.

This manner of operation will be more readily understood by reference to FIGURES 4 and 5, which show an air motor and control valve as described in the said co-pending application. The air motor 8 is shown as a displacement motor of the so-called Roots type having a pair of intermeshing lobed rotors 22 synchronised by so-called phasing gears 9. One side of the motor 8 is connected to the atmosphere by a duct 28, while the other side of the motor is connected by a duct 29 to a service port 30 in the control-valve cylinder bore 31. In this bore a shuttle-type control valve element 32 having two lands 33 and 34 as slidable, and, in addition to the service port 30, the valve cylinder has two other ports 35 and 36, respectively connected to pressure connection 27 and to an atmospheric connection 26. The system is so arranged that, when the engine runs at its normal cruising speed, no contribution from the air motor to the output speed is required, and for this reason the governor is arranged in this case to place the valve element 32 in a position, about halfway between those shown in FIGURES 4 and 5, in which the land 33 blanks off the service port 30 and thus prevents any air from passing through the air motor 8 in either direction. When the engine speed is lower than this value, the governor will move the valve element 32 to the left (as seen in the drawing) from this position, so that the land 33 will assume a position somewhat like that illustrated in FIGURE 4 in which, as shown, air under pressure from connection 27 is permitted to pass via the service port 30, the control valve duct 29, through the air motor, driving the same in the direction of the arrow 37, and then escaping through the atmospheric connection 26. If on the other hand the speed of the engine rises above the normal cruising speed, the valve element 32 is moved by the governor 25 in the opposite direction from its neutral position, so as to assume a position, somewhat like that illustrated in FIGURE 5, in which the land 33 permits communication between the service port 30 at the atmospheric port 36, while isolating both from the pressure-supply port 35. The air motor 8 is thus free to be driven by the reaction from the differential gear drive 3, 4, 5, 6, 7 to rotate in the reverse direction, as indicated by the arrow 38, and in doing so will pump air from duct 28 through control-valve duct 29 and ports 30 and 36 to the atmospheric connection 26, the rate of this flow being controlled by the amount of displacement of the above element 23 from its neutral position, which determines the effective areas of the ports 30 and 36. The second land 34 of the valve element 32 serves to control an auxiliary port 39 of the valve 23 when displacement of the valve element 32 to the right of the drawing continues beyond the point at which the ports 30 and 36 are completely uncovered. This auxiliary port serves to admit air under pressure from port 35 to an ejector device 40 in the atmospheric connection 26, thus reducing the pressure in that connection below atmospheric pressure, whereby a torque assisting rotation of the air motor 8 in the reverse direction indicated by the arrow 38 may be applied to the air motor 8.

Figure 2:
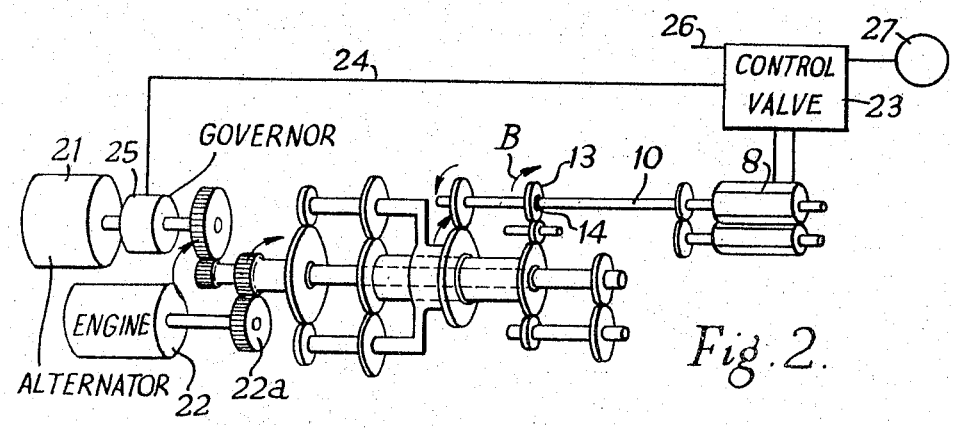

Assuming now that the engine runs at a speed of 4,300 r.p.m., corresponding to the lower limit of its cruising range, the air auxiliary motor 8 will have to run in its forward direction indicated by arrow B at a speed of 9,000 r.p.m., driving the planet carrier 5 at a corresponding speed in the direction of the arrow A, in order to supplement the engine-derived output speed sufficiently to reach the prescribed alternator speed of 8,000 r.p.m. In these circumstances, and whenever the alternator speed is at its designed value of 8,000 r.p.m. the gear 13 will be driven from shaft 1 by gears 18, 19, 20, 16 and idler 15 at a speed of 12,000 r.p.m. in the direction of the arrow B, which is the same direction in which, in these circumstances, shaft 10 is driven by air motor 8. The over-running clutch 14 is so arranged as to allow gear 13 to rotate freely on shaft 10 in the direction of the arrow B, that is to say it will only engage if the motor shaft 10 rotates in the direction of the arrow B and at a speed which is higher than that of gear 13. In the example of FIGURE 1 this is not the case, so that the provision of the additional gear 13 in conjunction with the over-running clutch 14 will not affect the running of the drive. This also applies in the case of FIGURE 2, in which the engine speed is so high that the engine-derived speed of the alternator exceeds 8,000 r.p.m., thus requiring a negative contribution from the auxiliary motor 8. In fact in FIGURE 2 the engine has been assumed to run at 8,700 r.p.m., which is the upper range of its cruising speed, and in this case the air motor shaft 10 is required to rotate at a speed of 9,000 r.p.m. in a direction opposite to arrow B in order to maintain the desired alternator speed of 8,000 r.p.m., causing gear 13 again to rotate in the direction of arrow B and at a speed of 12,000 r.p.m., the sprag clutch 14 being disengaged because the rotation of gear 13 relative to shaft 10 is again in the direction of arrow B.

Figure 3:
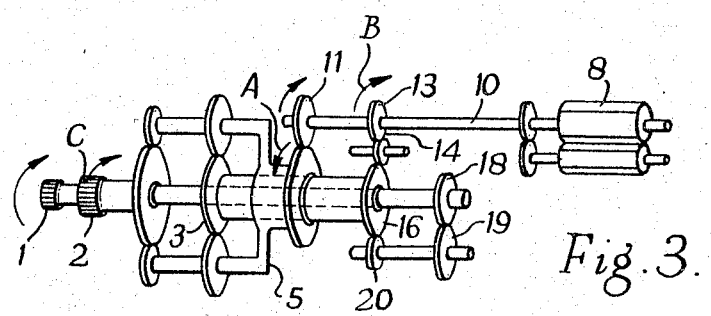
FIGURE 3 illustrates the same embodiment under starting or ground-running conditions.

Referring now to FIGURE 3, if the engine is to be started, the initial speeds of both the engine and the alternator are zero, so that both shafts 1 and 2 are at a standstill, the speed of the additional gear 13 being therefore likewise zero. If now the air motor 8 is operated to drive the shaft 10 in the direction of the arrow B, its gear 11 will drive the planet carrier in the direction of arrow A, and the rotation of shaft 10 will also engage the sprag clutch in the still stationary gear 13, thus forcing the latter to rotate at the same speed as the gear 11 and the shaft 10. The gear 13 will thus drive the sun wheel 3 and with it the alternator shaft 1 which is coupled to the sun wheel 3 by gearing 18, 19, 20, 16 the gear ratio being so chosen that the combined rotation of sun gear 3 and planet carrier 5 will produce a rotation of the sun gear 4 and engine shaft 2 in the normal running direction of the engine indicated by arrow C, and that the alternator shaft 1 reaches its design speed of 8,000 r.p.m. when the engine reaches the starter decoupling speed of 2,700 r.p.m. The engine will then develop power and accelerate the engine shaft 2 beyond the speed which is imparted to it by the air motor 8. As a result the speed of sun wheel 3 will increase beyond that at which it is driven by the shaft 10, causing the additional gear 13 to become uncoupled from the shaft 10 by means of the over-running clutch 14. As the engine accelerates towards its cruising range, the speed of air motor 8 will gradually decrease until the conditions illustrated in FIGURE 1 are restored.

If the drive is used for so-called ground running of aircraft equipment, that is to say for running engine auxiliaries at their normal speed while the engine is at standstill, the engine is de-coupled from shaft 2 by disengaging the coupling means 22a and the motor 8 is started to drive the shaft 10 in the direction of arrow B. The operation then is the same as that just described with reference to FIGURE 3 in connection with the starting operation except that the engine, being uncoupled from the shaft 2, is not driven and the engine shaft 2 is allowed to idle. In these circumstances the air motor 8 will accelerate the shaft 10 until the drive gear 13 will cause the alternator shaft to run at its prescribed speed of 8,000 r.p.m., which is the case when the engine shaft 2 runs at 2,700 r.p.m., and the shaft 10 with both gears 11 and 13 rotates in the direction of the arrow B at 12,000 r.p.m., the air motor is then stabilized at this speed by governor device schematically indicated at 28. Since suitable governor devices are well known in the art, the governor device 28 need not be described here in detail.

The invention is not limited to all details of the arrangement described with reference to the drawing but may be applied by providing an additional constraint between any two elements of the differential drive to any differential system of a constant-speed drive having a reversible auxiliary motor.

What I claim is:

1. In a mechanical constant-speed drive for transmitting driving power from a variable-speed engine to an element to be driven at a constant speed, the combination comprising a variable-speed air motor of the positive-displacement type, a pressure-fluid supply connection, an atmospheric connection, a differential gear drive having three legs respectively drivingly connected to the engine, the air motor and the element, flow-control means responsive to the speed of said element and connected to the air motor, the pressure-fluid supply connection and the atmospheric connection, said speed-responsive flow-control means being operative to so control the flow of fluid from said connections through the motor as to cause the air motor to operate in one direction to supplement the engine-derived speed of the element when the engine speed is below a pre-determined value, and to so control the flow of air through the air motor as to cause the air motor to run in the opposite direction to reduce the speed at which the element is driven by the differential gear drive below the engine-derived speed when the engine speed is higher than the said pre-determined value, and a gear train by-passing part of the differential gear drive and drivingly interconnecting the air motor and that leg of the differential gear drive which is drivingly connected to the element, said gear train including an overrunning clutch which engages only when the speed supplied to the element through the gear train is greater than that supplied by the differential gear drive, the ratio of said gear train being such that, throughout a predetermined speed range of the engine including said predetermined speed, the speed supplied to the element by the differential gear drive is greater than the speed supplied by said gear train.

2. A constant-speed drive as claimed in claim 1, wherein the overrunning clutch is interposed between the gear train and the air motor.

3. In a power plant including an engine having a speed variable within a given range and an engine accessory required to be driven at a substantially constant speed, the combination comprising a variable-speed reversible auxiliary motor, a differential gear drive having three legs respectively drivingly connected to the engine, the auxiliary motor, and the accessory, means responsive to the speed of the accessory and operative to so control the auxiliary motor as to cause the latter to operate in one direction to supplement the engine-derived speed of the accessory as necessary when the engine speed is between the lower limit of said given range and a predetermined value within said range, and to cause the auxiliary motor to operate in the opposite direction to reduce the speed of the accessory below the engine derived speed as necessary when the engine speed is between said predetermined value and the upper limit of said given range, and a gear train by-passing part of said differential gear drive and drivingly connecting the auxiliary motor and that leg of the differential gear drive which is drivingly connected to the accessory, said gear train including an overrunning clutch which engages only when the speed supplied to the element through the gear train is greater than that supplied by the differential gear drive, the ratio of said gear train being such that throughout said given speed range of the engine the speed supplied to the element by the differential gear drive is greater than the speed supplied by said gear train.

4. In a power plant including an engine having a speed variable within a given range and an engine accessory required to be driven at a substantially constant speed, the combination as claimed in claim 3, wherein the overrunning clutch is interposed between the gear train and the auxiliary motor.

References Cited by the Examiner

UNITED STATES PATENTS

| | | | |
|---|---|---|---|
| 2,363,201 | 11/1944 | Popoff | 74—675 |
| 2,402,547 | 6/1946 | Gilfillan | 74—675 X |
| 2,908,189 | 10/1959 | Parker et al. | 74—675 |
| 2,972,911 | 2/1961 | Volk et al. | 74—675 X |

DAVID J. WILLIAMOWSKY, *Primary Examiner.*

THOMAS C. PERRY, *Examiner.*